United States Patent
Spitsberg

(10) Patent No.: US 6,699,607 B1
(45) Date of Patent: Mar. 2, 2004

(54) THERMAL/ENVIRONMENTAL BARRIER COATING FOR SILICON-CONTAINING SUBSTRATES

(75) Inventor: Irene Spitsberg, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/065,558

(22) Filed: Oct. 30, 2002

(51) Int. Cl.$^7$ .............................. B32B 9/00; F03B 3/12
(52) U.S. Cl. ..................... 428/702; 428/446; 428/448; 428/469; 428/697; 428/699; 428/701; 416/241 B
(58) Field of Search ................... 428/446, 448, 428/469, 697, 698, 699, 701, 702; 416/241 B; 501/108, 118, 121, 122, 123, 125, 127, 128, 133, 135, 153, 154

(56) References Cited

U.S. PATENT DOCUMENTS

| | | | |
|---|---|---|---|
| 4,734,073 A | * 3/1988 | Smith et al. | |
| 4,942,732 A | * 7/1990 | Priceman | |
| 5,250,360 A | 10/1993 | Andrus et al. | ............... 427/471 |
| 5,641,440 A | * 6/1997 | Talmy et al. | |
| 5,985,470 A | 11/1999 | Spitsberg et al. | ............ 428/689 |
| 6,254,935 B1 | 7/2001 | Eaton et al. | ............. 427/376.2 |
| 6,352,790 B1 | 3/2002 | Eaton et al. | ................. 428/689 |
| 6,365,288 B1 | 4/2002 | Eaton et al. | ................. 428/697 |
| 6,387,456 B1 | 5/2002 | Eaton, Jr. et al. | ............ 427/452 |
| 6,410,148 B1 | 6/2002 | Eaton, Jr. et al. | ........... 428/446 |
| 6,444,335 B1 | 9/2002 | Wang et al. | ................. 428/701 |

\* cited by examiner

Primary Examiner—Deborah Jones
Assistant Examiner—Jennifer McNeil
(74) Attorney, Agent, or Firm—David L. Narciso; Gary M. Hartman; Domenica N. S. Hartman

(57) ABSTRACT

A coating composition (24) for a thermal/environmental barrier coating (T/EBC) system (14) particularly suited for protecting silicon-containing substrates (12), such as articles exposed to high temperatures including the hostile thermal environment of a gas turbine engine. The coating composition (24) is an alkaline earth aluminate or an alkaline earth aluminosilicate containing, by molar percent, about 20% to about 40% barium oxide, about 9% to about 20% strontia, about 19% to about 50% alumina, and optionally up to about 40% silica, wherein barium oxide and strontia are present in a combined amount of about 37 to about 50 molar percent of the coating composition (24). The T/EBC system (14) may include one or more intermediate layers (16,20,22) that adhere the coating composition (24) to the silicon-containing surface (12). The T/EBC system (14) may further include an outermost coating (18) of stabilized zirconia or another high-temperature ceramic material.

33 Claims, 2 Drawing Sheets

THERMAL/ENVIRONMENTAL BARRIER COATING FOR SILICON-CONTAINING SUBSTRATES

BACKGROUND OF INVENTION

1. Field of the Invention

This invention relates to coating systems suitable for protecting components exposed to high-temperature environments, such as the hot gas flow path through a gas turbine engine. More particularly, this invention is directed to a coating composition that exhibits improved high temperature stability when used to protect a silicon-containing substrate.

2. Description of the Related Art

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through formulation of iron, nickel and cobalt-base superalloys. While superalloys have found wide use for components throughout gas turbine engines, alternative materials have been proposed. For example, composite materials, particularly silicon-based composites with silicon carbide (SiC) as a matrix and/or as a reinforcing material, are currently being considered for high temperature applications, such as combustor liners, vanes, shrouds, airfoils, and other hot section components of gas turbine engines.

In many high temperature applications, a protective coating is beneficial or required for a Si-containing material. For example, protection with a suitable thermal-insulating layer reduces the operating temperature and thermal gradient through the material. Additionally, such coatings should provide environmental protection by inhibiting the major mechanism for degradation of Si-containing materials in a corrosive water-containing environment, namely, the formation of volatile silicon monoxide (SiO) and silicon hydroxide ($Si(OH)_4$) products. Consequently, besides low thermal conductivity, stability is a critical requirement of a thermal barrier coating system for a Si-containing material in high temperature environments containing water vapors. Other important properties for the coating material include a coefficient of thermal expansion (CTE) compatible with the SiC-containing material, low permeability for oxidants, and chemical compatibility with the Si-containing material and silica scale formed from oxidation. As a result, suitable protective coatings for gas turbine engine components formed of Si-containing materials essentially have a dual function, serving as a thermal barrier and simultaneously providing environmental protection. A coating system having this dual function may be termed a thermal/environmental barrier coating (T/EBC) system.

Various single-layer and multilayer T/EBC systems have been investigated for use on Si-containing substrates. Coatings of zirconia partially or filly stabilized with yltria (YSZ) as a thermal barrier layer exhibit excellent environmental resistance. However, YSZ does not adhere well to Si-containing materials (SiC or silicon) because of a CTE mismatch (about 10 ppm/° C. for YSZ as compared to about 4.9 ppm/° C. for SiC/SiC composites). Mullite ($3Al_2O_3.2SiO_2$) has been proposed as a bond coat for YSZ on Si-containing substrate materials to compensate for this difference in CTE (mullite having a CTE of about 5.5 ppm/° C.). Barium strontium aluminosilicate (BSAS; ($Ba_{1-x}Sr_x$)O—$Al_2O_3$—$SiO_2$) has also been proposed as a bond coat for YSZ in U.S. Pat. No. 5,985,470 to Spitsberg et al., U.S. Pat. No. 6,299,988 to Wang et al., and U.S. Pat. No. 6,444,335 to Wang et al., which are assigned to the assignee of the present invention. BSAS and other alkaline earth aluminosilicates have also been proposed as protective coatings for Si-containing materials in view of their excellent environmental protection properties and low thermal conductivity.

For example, U.S. Pat. Nos. 6,254,935, 6,365,288, 6,387,456, and 6,410,148 to Eaton et al. disclose the use of BSAS as outer protective barrier coatings for Si-containing substrates. U.S. Pat. No. 6,410,148 also discloses barium oxide (BaO) and barium aluminosilicates (BAS) as suitable barrier coatings for Si-containing substrates.

Stoichiometric BSAS ($0.75BaO.0.25SrO.Al_2O_3.2SiO_2$, or an alkaline-earth:aluminosilicate molar percentage ratio of about 25:75) has been reported as the preferred alkaline earth aluminosilicate composition, examples of which include U.S. Pat. Nos. 6,254,935, 6,365,288, 6,387,456, and 6,410,148. Non-stoichiometric BSAS compositions have also been proposed. For example, U.S. Pat. No. 6,352,790 to Eaton et al. discloses a barrier layer formed of a mixture of an alkaline earth aluminosilicate (e.g., stoichiometric BSAS) and an additive, disclosed as being alumina ($Al_2O_3$) or a phase formed of alumina and either barium oxide or strontia (SrO). The resulting barrier layer is referred to as a non-stoichiometric BSAS, BAS or strontium aluminosilicate (SAS) as a result of an increased alumina content and a sub-stoichiometric silica ($SiO_2$) content. However, the barrier layer is not disclosed as being a homogeneous, single-phase composition, but is instead an aluminosilicate in which are dispersed phases formed by reaction of the additive with free silica that deposits or forms in the barrier coating.

Notwithstanding the above-noted advances in T/EBC materials for Si-containing substrates, further improvements in coating life would be desirable. In particular, longer exposures at temperatures sustained in the combustion environment of a gas turbine engine (e.g., high pressure steam and high gas velocities) have resulted in the volatilization of existing BSAS materials, causing coating recession that ultimately leads to degradation of the environmental protective properties of the coating. Therefore, it would be desirable if coatings for silicon-containing substrates were available that exhibit still lower recession rates.

SUMMARY OF INVENTION

The present invention provides a coating composition for use in a thermal/environmental barrier coating (T/EBC) system particularly suited for protecting silicon-containing substrates, such as articles exposed to high temperatures including the hostile thermal environment of a gas turbine engine.

The coating composition of this invention contains barium oxide, strontia, alumina and optionally silica in molar percentage ratios different than that of stoichiometric BSAS (18.75:6.25:25:50). More particularly, if silica is omitted, the coating composition is not an alkaline earth aluminosilicate, but an alkaline earth aluminate. If silica is present, the $Al_2O_3+SiO_2$ content in the coating composition is about 50 to 63 molar percent (compared to about 75 molar percent for stoichiometric BSAS), resulting in a BaO+SrO content of about 37 to 50 molar percent (compared to about 25 molar percent for stoichiometric BSAS). While not wishing to be held to any particular theory, it is believed that the relatively higher BaO+SrO content and relatively lower $Al_2O + _3SiO_2$ content in the coating composition renders the composition more stable over long exposures at high temperatures than stoichiometric BSAS.

Five particular phases have been identified whose high temperature stability has been concluded to be better than that of stoichiometric BSAS. One such phase contains, by molar percent, about 37% to about 39% barium oxide, about 9% to about 11% strontia, about 47% to about 49% alumina, and up to about 5% silica, yielding a molar ratio of barium oxide, strontia, alumina and silica of about 0.8:0.2:1:0.1, respectively. Therefore, both the BaO+SrO content and the $Al_2O_3+SiO_2$ content in the composition is about 50 molar percent. Another phase identified with this invention contains, by molar percent, about 27% to about 28% barium oxide, about 9% to about 10% strontia, about 31% to about 32% alumina, and about 31% to about 32% silica, yielding a molar ratio of barium oxide, strontia, alumina and silica of about 1.3:0.4:1.5:1.5, respectively. Therefore, the BaO+SrO and $Al_2O_3+SiO_2$ contents in the composition are about 37 and 63 molar percent, respectively. Broad compositional ranges for the coating composition of this invention are, by molar percent, about 20% to about 40% barium oxide, about 9% to about 20% strontia, about 19% to about 50% alumina, and up to about 40% silica.

A coating system incorporating the coating composition of this invention preferably includes a bond coat between the coating composition and the silicon-containing surface, by which the coating composition is adhered to the surface. Suitable bond coats may comprise one or more layers of silicon, mullite, stoichiometric BSAS, and mixtures of mullite and stoichiometric BSAS. To increase its allowable outer surface temperature, the coating system may further include an outermost coating on and contacting the coating composition. Suitable materials for the outermost coating include stabilized zirconia or another high-temperature ceramic material.

Compositions for the coating composition of this invention are generally characterized by aluminum-rich and strontium-rich ceramic phases. These phases are believed to contribute to the ability of the coating composition to exhibit a lower recession rate in the combustion environment of a gas turbine engine. While non-stoichiometric in terms of alkaline earth aluminosilicate compositions used in the past, the coating composition of this invention is chemically similar to stoichiometric BSAS. As a result, the coating composition can be deposited on stoichiometric BSAS, with the expectation that a strong chemical bond will exist therebetween that promotes the mechanical integrity of the coating system.

Other objects and advantages of this invention will be better appreciated from the following detailed description.

DETAILED DESCRIPTION

The present invention is a coating composition for a T/EBC system suitable for protecting silicon-containing components subjected to high temperatures in the presence of water (water vapor), including the high and low pressure turbine vanes (nozzles) and blades (buckets), shrouds, combustor liners and augmentor hardware of gas turbine engines. Examples of silicon-containing materials for such applications include those with a dispersion of silicon carbide, silicon nitride and/or silicon reinforcement material in a metallic or nonmetallic matrix, as well as those having a silicon carbide, silicon nitride and/or silicon-containing matrix, and particularly composite materials that employ silicon carbide, silicon nitride and/or silicon as both the reinforcement and matrix materials (e.g., SiC/SiC ceramic matrix composites (CMC)). While the advantages of this invention will be described with reference to gas turbine engine components, the teachings of the invention are generally applicable to any silicon-containing component whose silicon content is subject to volatilization.

Figure 1:
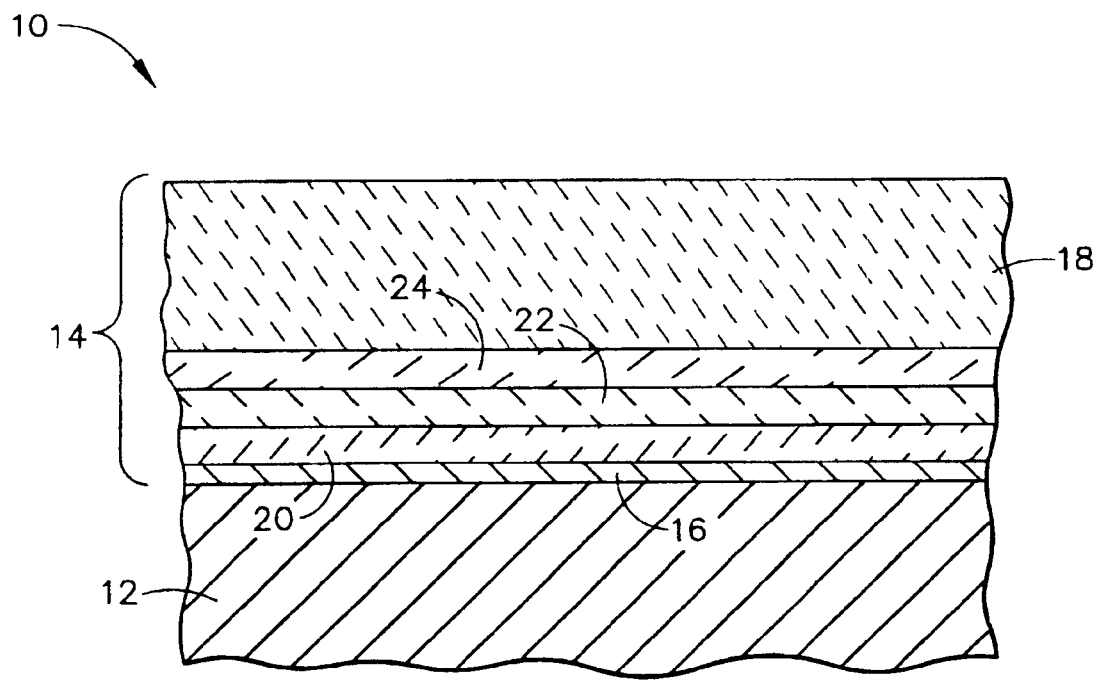
FIG. 1 schematically represents a T/EBC system in accordance with the present invention.

A multilayer coating system 14 in accordance with an embodiment of this invention is schematically represented in FIG. 1. As shown in FIG. 1, the surface region 12 of a silicon-containing component 10 is protected by the T/EBC system 14, which includes an optional top coat 18, a coating composition 24 containing an alkaline-earth metal ceramic (alkaline earth) composition of this invention, and a multilayer bond coat formed of bond coat layers 16 and 20. The coating system 14 is intended to provide environmental protection to the underlying surface region 12, as well as reduce the operating temperature of the component 10, thereby enabling the component 10 to survive within higher temperature environments than otherwise possible. To promote the latter, a particularly suitable material for the top coat 18 is stabilized zirconia, preferably yttria-stabilized zirconia (YSZ), though it is foreseeable that other high-temperature ceramic materials could be used. A suitable thickness range for the top coat 18 is about 25 to about 750 µm, with a preferred range believed to be about 50 to about 125 µm, depending on the particular application.

The major mechanism for degradation of silicon and silicon-based compounds (e.g., silicon carbide) in a corrosive environment is the formation of volatile silicon monoxide (SiO) and silicon hydroxide ($Si(OH)_4$) products. The diffusivity of oxidants in the top coat 18 is generally very high if formed of YSZ. As a preferred aspect of the invention, the alkaline-earth metal ceramic composition of the coating composition 24 exhibits low diffusivity to oxidants, e.g., oxygen and water vapor, and therefore inhibits oxidation of the silicon content within the surface region 12, while also being sufficiently chemically and physically compatible with the surface region 12 to remain adherent to the region 12 under severe thermal conditions. Finally, the bond coat layers 16 and 20 serve to promote the adhesion of the coating composition 24 to the surface region 12 of the component 10. Suitable materials for the bond coat layers 16 and 20 include silicon, mullite, and mixtures of mullite and stoichiometric BSAS. For example, the inner bond coat layer 16 may consist essentially of silicon, while the outer bond coat layer 20 may consist essentially of mullite or a mixture of mullite and stoichiometric BSAS. An optional third layer 22 is shown in FIG. 1, and if present is preferably formed of stoichiometric BSAS as an environmental and/or transition layer between the different materials of the coating composition 24 and the bond coat layers 16 and 20.

The use of silicon as the innermost layer 16 of the coating system 14 is particularly useful to improve oxidation resistance of the surface region 12 and enhance bonding between the surface region 12 and subsequent layers (e.g., mullite) if the surface region 12 contains SiC or silicon nitride ($Si_3N_4$). A suitable thickness for the silicon layer 16 is about 75 to about 125 micrometers.

Mullite or a mixture of mullite and stoichiometric BSAS is useful as the middle bond coat layer 20 for adhering a BSAS layer (e.g., layer 22) to the Si-containing surface region 12, while also preventing interactions between BSAS and the surface region 12 at high temperatures. The presence of BSAS in a mixed layer with mullite is compatible with the Si-containing surface region 12 in terms of having a CTE of about 5.27 ppm/° C., which is closer to the CTE of SiC/SiC CMC (about 4.9 ppm/° C.) than mullite (about 5.5 ppm/° C.). A suitable thickness range for a mullite/mullite+BSAS bond coat layer 20 is about 75 to about 125 $\mu$m, depending on the particular application.

The presence of a separate BSAS layer 22 overlying a mullite/mullite+BSAS layer 20 provides excellent environmental protection and thermal barrier properties due to stoichiometric BSAS having a low thermal conductivity. In particular, stoichiometric BSAS is able to serve as an environmental barrier to an underlying mullite-containing layer (e.g., layer 20), which can exhibit significant silica activity and volatilization if exposed to water vapor at high temperatures. As a result, the presence of the BSAS layer 22 is able to inhibit the growth of an interfacial silica layer at the surface region 12 when the component 10 is exposed to the oxidizing environment of a gas turbine engine. In addition, BSAS is physically compliant with a SiC-containing substrate, such as the surface region 12, and is relatively compatible with mullite and the Si-containing surface region 12 in terms of CTE. A suitable thickness range for the BSAS layer 22 is about 125 to about 500 $\mu$m, depending on the particular application.

The alkaline-earth metal ceramic material of the coating composition 24 is generally characterized by aluminum-rich and strontium-rich ceramic phases that are believed to contribute to the ability of the layer 24 to exhibit a lower recession rate than stoichiometric BSAS compositions, such as the BSAS layer 22 of the coating system 14. To have this advantage, the coating composition 24 contains, by molar percent, about 20% to about 40% barium oxide, about 9% to about 20% strontia, about 19% to about 50% alumina, and up to about 40% silica, wherein the BaO+SrO content in the coating composition is about 37 to 50 molar percent and the $Al_2O_3+SiO_2$ content is about 50 to 63 molar percent. Within this compositional range, five particular phases have been identified whose high temperature stability is better than that of stoichiometric BSAS. These phases, identified as A through E, are summarized in Table I below.

case, the BaO+SrO and $Al_2O_3+SiO_2$ contents in the coating composition 24 are relatively higher and lower, respectively, than stoichiometric BSAS.

Figure 2:
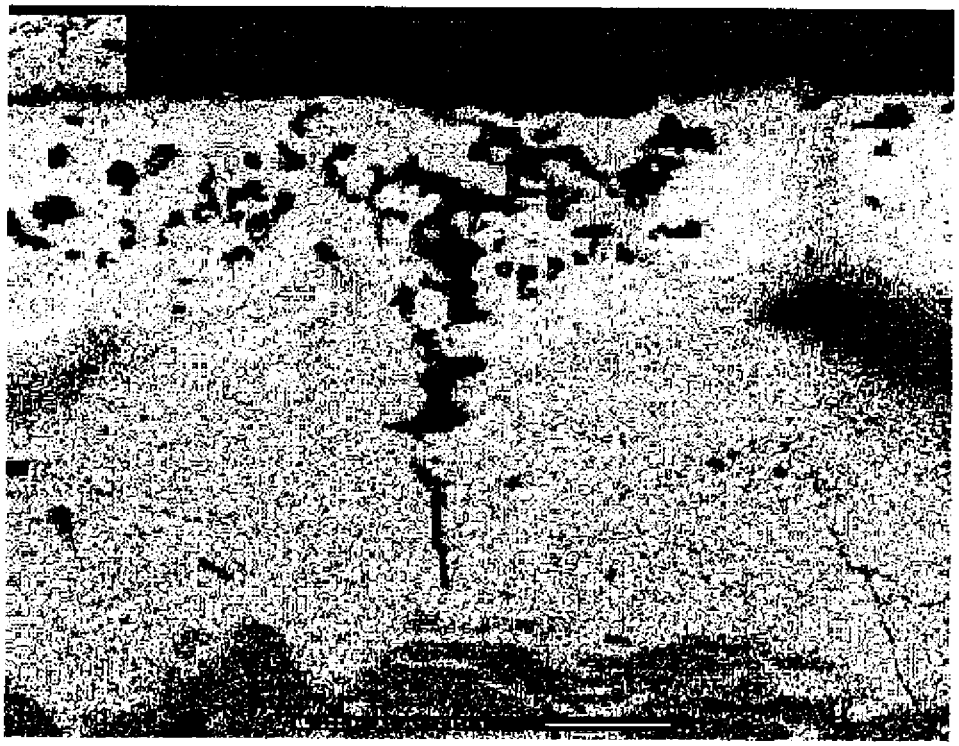
FIG. 2 is a scanned image of a stoichiometric BSAS coating that had undergone JET testing conditions at about 2500° F., and which exhibited aluminum-rich and strontium-rich ceramic phases.

In an investigation leading to this invention, a stoichiometric BSAS coating ($0.75BaO.0.25SrO.Al_2O_3.2SiO_2$) on a SiC/SiC CMC was subjected to a flame test in which surface temperatures of about 2500° F. (about 1370° C.) were sustained for about fifty hours with a five-minute temperature cycle. The test combined the presence of water vapor (from the combustion of a propane and oxygen mixture used as the flame source) and a gas velocity comparable to Mach 0.5 from the impinging jet stream. Examination of the coating samples after the completion of the test revealed that local volatilization of the BSAS coating had occurred, resulting in the formation of porosity in the coating as shown in FIG. 2. On further analysis, it was determined that the pores were the result of a portion of the silica component of the BSAS coating being volatilized, and that the composition of the material surrounding the pores contained aluminum-rich (alumina) and strontium-rich (strontia) phases which did not exhibit any signs of volatilization. While aluminum-rich and strontium-rich phases are present in much smaller amounts in stoichiometric BSAS coatings in the as-deposited condition, the greater amounts of these phases coincided with depletion of silica from the BSAS coating in the investigation, resulting in a non-stoichiometric BSAS material characterized by relatively high levels of alumina and strontia, and significantly lower levels of silica.

The non-volatilized ceramic phases observed in the BSAS coating were determined by microprobe to have the following approximate compositions, which are the basis for the ceramic phase compositions identified in Table 1.

TABLE II

| Molar Percent Phase | Molar Percent BaO | Molar Percent SrO | Molar Percent $Al_2O_3$ | Molar Percent $SiO_2$ |
| --- | --- | --- | --- | --- |
| A1 | 38.9 | 9.97 | 47.68 | 3.65 |
| A2 | 37.5 | 10.85 | 47.38 | 4.23 |
| B1 | 25.4 | 15.31 | 20.04 | 39.2 |
| C1 | 20.8 | 15.1 | 42.7 | 21.5 |
| D1 | 22.5 | 14.46 | 32.88 | 30.16 |
| E1 | 27.8 | 9.4 | 31.59 | 31.16 |

Accordingly, all of the ceramic phases were generally aluminosilicates, but with a molar ratio for

TABLE I

| | Molar Percent | | | | Molar Ratio | | | | Molar Percent | |
| --- | --- | --- | --- | --- | --- | --- | --- | --- | --- | --- |
| | BaO | SrO | $Al_2O_3$ | $SiO_2$ | BaO | SrO | $Al_2O_3$ | $SiO_2$ | BaO + SrO | $Al_2O_3$ + $SiO_2$ |
| A | 37–39 | 9–11 | 47–49 | to 5 | 0.8 | 0.2 | 1 | 0.1 | 50 | 50 |
| B | 25–26 | 15–16 | 19–21 | 39–40 | 1.25 | 0.75 | 1 | 2 | 40 | 60 |
| C | 20–21 | 14–16 | 42–43 | 21–22 | 1.25 | 0.75 | 2 | 1 | 37 | 63 |
| D | 22–23 | 14–15 | 32–33 | 30–31 | 1.25 | 0.75 | 1.5 | 1.5 | 37 | 63 |
| E | 27–28 | 9–10 | 31–32 | 31–32 | 1.3 | 0.4 | 1.5 | 1.5 | 37 | 63 |

Each of the above compositions for the coating composition 24 differs from stoichiometric BSAS ($0.75BaO.0.25SrO.Al_2O_3.2SiO_2$). Phase A, if silica-free, is a near-stoichiometric alkaline earth alumrinate having the approximate composition of $(BaO.SrO).Al_2O_3$. Phase A containing silica (e.g., about 3 to 5 molar percent) and the remaining ceramic phase compositions can be referred to as non-stoichiometric alkaline earth aluminosilicates. In each $BaO:SrO:Al_2O_3:SiO_2$ significantly different than the original stoichiometric BSAS coating. As evident from Table II, the non-volatilized aluminosilicate phases were relatively rich in barium oxide and strontia, and depleted of $SiO_2$, in comparison to stoichiometric BSAS (by molar percent, 18.75% barium oxide, 6.25% strontia, 25% alumina and 50% silica). All but one of the ceramic phases were also rich in alumina. Each of the phases shared the characteristic of having a higher BaO+SrO molar content (about 37 to 50 molar percent) and a lower $Al_2O_3+SiO_2$ molar content (about 50 to 63 molar percent) than the corresponding 25:75 molar ratio found in stoichiometric BSAS.

From the above, it was concluded that the combination of a higher alkaline earth content, a higher alumina content, and lower silicon content in an alkaline-earth aluminosilicate should have the effect of reducing the volatilization rate under severe conditions within a gas turbine engine. As such, a coating (e.g., coating composition 24 in FIG. 1) formed predominantly or entirely of one or more of the ceramic phases identified in Table I should exhibit significantly lower recession rate than stoichiometric BSAS. Because the ceramic phases identified in Table I are chemically similar to stoichiometric BSAS, it was also concluded that the coating composition 24 formed of any one or more of these phases would form a strong chemical bond with BSAS, such as the BSAS layer 22 of the coating system 14 in FIG. 1, thereby promoting the mechanical integrity of the coating system 14 on the Si-containing surface region 12 of a SiC/SiC CMC.

The silica content of the ceramic phases is believed to be of particular interest. It was concluded that a silica-free coating, i.e., the phase A composition of Table I modified to be free of silica to yield an alkaline earth aluminate, could potentially offer the best resistance to recession. An example is a molar ratio of about $0.8BaO.0.2SrO.Al_2O_3$, though other barium strontium aluminate compositions are also believed to be resistant to recession as a result of the substantial absence of silica. However, with its relatively high $Al_2O_3$ content, the CTE of a silica-free phase A coating may be sufficiently higher than BSAS to lead to spallation from thermal cycling. Therefore, it may be preferable to use a silica-free coating as an outermost layer if appropriate intermediate layers are present, such as one or more of the layers 16 and 20 discussed above and represented in FIG. 1. On the other hand, it was concluded that the phase B, C, D and E compositions, which contain silica levels intermediate a silica-free phase A composition and stoichiometric BSAS, are also desirable compositions that exhibit resistance to recession. Such intermediate compositions should be useful as an outermost layer or as an environmental coating protected by an outermost layer, such as the top coat 18 discussed above and represented in FIG. 1.

In view of the above, several coating systems are envisioned, depending on the particular application for the coating system. For CMC articles in which the temperature at the CMC/coating interface may reach about 2400° F. (about. 13.15° C.) and surface temperatures may reach about 2600° F. (about 1425° C.), a four-layer T/EBC coating system may be used, in which the innermost layer is silicon (e.g., layer 16 in FIG. 1), the outermost layer (e.g., layer 24 in FIG. 1 wherein the top coat 18 is omitted) is formed of one or more of the ceramic phase compositions of this invention, and two intermediate layers (e.g., layers 20 and 22 in FIG. 1) are present: the inner layer (e.g., layer 20) of which is formed of either a crack-free mullite or a mixture of mullite and stoichiometric BSAS; the outer layer (e.g., layer 22) of which is formed of stoichiometric BSAS. In such a coating system, the BSAS layer 22 would contribute as an environmental barrier coating. Alternatively, the BSAS layer 22 could be omitted, such that the coating composition 24 of this invention would serve as the primary environmental barrier coating.

For applications in which the CMC/coating interface and coating surface are expected to sustain temperatures of up to about 2400° F. (about 1315° C.) and about 3100° F. (about 1700° C.), respectively, an outer coating composition (e.g., top coat 18 in FIG. 1) is desirable. A transition layer formed of one or more of the ceramic phase compositions of this invention can serve as a transition layer between a stoichiometric BSAS layer (e.g., layer 22) and a top coat 18 formed of YSZ or another high-temperature ceramic material, or can be used instead of a BSAS layer. For example, a five-layer T/EBC coating system may be used, in which the innermost layer is silicon (e.g., layer 16 in FIG. 1), the outermost layer (e.g., layer 18 in FIG. 1) is YSZ or another high-temperature ceramic material, and the three intermediate layers include an inner intermediate layer (e.g., layer 20) of either a crack-free mullite or a mixture of mullite and stoichiometric BSAS, a middle intermediate layer (e.g., layer 22) of stoichiometric BSAS, and an outer intermediate layer (e.g., 24) of one or more of the ceramic phase compositions of this invention. Again, the BSAS layer 22 could be omitted in either of these coating systems, such that the coating composition 24 of this invention serves as the primary environmental barrier coating as well as a transition layer that is chemically stable with YSZ and has a CTE intermediate that of YSZ and both BSAS and mullite.

The ceramic phase compositions of this invention can be formed by various methods. For example, a powder of the desired composition can be deposited by spraying, such as air plasma spraying (APS) or low pressure plasma spraying (LPPS), though it is foreseeable that deposition could be performed by other known techniques, such as chemical vapor deposition (CVD) and high velocity oxy-fuel (HVOF). Alternatively, a desired composition can be formed in-situ by codepositing two or more powders in ratios that will yield the composition. For example, powders of the individual oxides could be co-deposited at appropriate ratios for the desired composition, followed by a heat treatment. Because the desired cerarmic phases of this invention were observed to form during prolonged testing at temperatures of about 1200° C., generally up to about 1370° C., it is expected that the desired ceramic phases should form during a heat treatment at temperatures of about 1300° C. over a duration of about twenty-five hours.

While the invention has been described in terms of a preferred embodiment, it is apparent that other forms could be adopted by one skilled in the art. Therefore, the scope of the invention is to be limited only by the following claims.

What is claimed is:

1. A coating composition on a gas turbine engine component, the coating composition containing an alkaline-earth metal ceramic composition containing barium oxide, strontia, alumina, and optionally silica, wherein barium oxide and strontia are present in a combined amount of about 37 to about 50 molar percent of the coating composition, the balance essentially alumina and the optional silica present in the coating composition.

2. A coating composition according to claim 1, wherein the alkaline-earth metal ceramic composition is a substantially silica-free barium strontium aluminate.

3. A coating composition according to claim 2, wherein the alkaline-earth metal ceramic composition consists of barium oxide, strontia and alumina in a molar ratio of about 0.8:0.2:1, respectively, and incidental impurities.

4. A coating composition according to claim 1, wherein the alkaline-earth metal ceramic composition consists of barium oxide, strontia, alumina, and silica in a molar ratio of about 0.8:0.2:1:0.1, respectively, and incidental impurities.

5. A coating composition according to claim 4, wherein the alkaline-earth metal ceramic composition contains, by molar percent, about 37% to about 39% barium oxide, about 9% to about 11% strontia, about 47% to about 49% alumina, about 3% to about 5% silica, and incidental impurities.

6. A coating composition according to claim 1, wherein the alkaline-earth metal ceramic composition consists of barium oxide, strontia, alumina, and silica in a molar ratio of about 1.25:0.75:1:2, respectively, and incidental impurities.

7. A coating composition according to claim 6, wherein the alkaline-earth metal ceramic composition contains, by molar percent, about 25% to about 26% barium oxide, about 15% to about 16% strontia, about 19% to about 21% alumina, about 39% to about 40% silica, and incidental impurities.

8. A coating composition according to claim 1, wherein the alkaline-earth metal ceramic composition consists of barium oxide, strontia, alumina, and silica in a molar ratio of about 1.25:0.75:2:1, respectively, and incidental impurities.

9. A coating composition according to claim 8, wherein the alkaline-earth metal ceramic composition contains, by molar percent, about 20% to about 21% barium oxide, about 14% to about 16% strontia, about 42% to about 43% alumina, about 21% to about 22% silica, and incidental impurities.

10. A coating composition according to claim 1, wherein the alkaline-earth metal ceramic composition consists of barium oxide, strontia, alumina, and silica in a molar ratio of about 1.25:0.75:1.5:1.5, respectively, and incidental impurities.

11. A coating composition according to claim 10, wherein the alkaline-earth metal ceramic composition contains, by molar percent, about 22% to about 23% barium oxide, about 14% to about 15% strontia, about 32% to about 33% alumina, about 30% to about 31% silica, and incidental impurities.

12. A coating composition according to claim 1, wherein the alkaline-earth metal ceramic composition consists of barium oxide, strontia, alumina, and silica in a molar ratio of about 1.3:0.4:1.5:1.5, respectively, and incidental impurities.

13. A coating composition according to claim 12, wherein the alkaline-earth metal ceramic composition contains, by molar percent, about 27% to about 28% barium oxide, about 9% to about 10% strontia, about 31% to about 32% alumina, about 31% to about 32% silica, and incidental impurities.

14. A coating composition according to claim 1, wherein the coating composition consists of the alkaline-earth metal ceramic composition, and the alkaline-earth metal ceramic composition-contains, by molar percent, about 20% to about 40% barium oxide, about 9% to about 20% strontia, about 19% to about 50% alumina, and up to about 40% silica.

15. A coating composition according to claim 1, wherein the coating composition is part of a barrier coating system on a silicon-containing surface of a component, the barrier coating system further comprising at least one intermediate layer between the coating composition and the silicon-containing surface, the at least one intermediate layer being formed of a material chosen from the group consisting of silicon, mullite, BSAS, and mixtures of mullite and BSAS.

16. A coating composition according to claim 15, further comprising an outermost coating on and contacting the coating composition, the outermost coating comprising stabilized zirconia.

17. A barrier coating system on a silicon-containing surface of a gas turbine engine component, the barrier coating system comprising an intermediate layer and a coating composition on the intermediate layer, the intermediate layer comprising a layer formed of a material chosen from the group consisting of silicon, mullite, stoichiometric BSAS, and mixtures of mullite and stoichiometric BSAS, the coating composition consisting essentially of at least one alkaline earth-containing composition chosen from the group consisting of:
  barium strontium aluminate;
  by molar percent, about 37% to about 39% barium oxide, about 9% to about 11% strontia, about 47% to about 49% alumina, about 3% to about 5% silica, and incidental impurities;
  by molar percent, about 25% to about 26% barium oxide, about 15% to about 16% strontia, about 19% to about 21% alumina, about 39% to about 40% silica, and incidental impurities;
  by molar percent, about 20% to about 21% barium oxide, about 14% to about 16% strontia, about 42% to about 43% alumina, about 21% to about 22% silica, and incidental impurities;
  by molar percent, about 22% to about 23% barium oxide, about 14% to about 15% strontia, about 32% to about 333% alumina, about 30% to about 31% silica, and incidental impurities; and
  by molar percent, about 27% to about 28% barium oxide, about 9% to about 10% strontia, about 31% to about 32% alumina, about 31% to about 32% silica, and incidental impurities.

18. A barrier coating system according to claim 17, wherein the alkaline earth-containing composition consists of barium oxide, strontia and alumina in a molar ratio of about 0.8:0.2:1, respectively, and incidental impurities.

19. A barrier coating system according to claim 17, wherein the alkaline earth-containing composition consists of, by molar percent, about 37% to about 39% barium oxide, about 9% to about 11% strontia, about 47% to about 49% alumina, about 3% to about 5% silica, and incidental impurities.

20. A barrier coating system according to claim 17, wherein the alkaline earth-containing composition consists of, by molar percent, about 25% to about 26% barium oxide, about 15% to about 16% strontia, about 19% to about 21% alumina, about 39% to about 40% silica, and incidental impurities.

21. A barrier coating system according to claim 17, wherein the alkaline earth-containing composition consists of, by molar percent, about 20% to about 21% barium oxide, about 14% to about 16% strontia, about 42% to about 43% alumina, about 21% to about 22% silica, and incidental impurities.

22. A barrier coating system according to claim 17, wherein the alkaline earth-containing composition consists of, by molar percent, about 22% to about 23% barium oxide, about 14% to about 15% strontia, about 32% to about 33% alumina, about 30% to about 31% silica, and incidental impurities.

23. A barrier coating system according to claim 17, wherein the alkaline earth-containing composition consists of, by molar percent, about 27% to about 28% barium oxide, about 9% to about 10% strontia, about 31% to about 32% alumina, about 31% to about 32% silica, and incidental impurities.

24. A barrier coating system according to claim 17, further comprising an outermost coating on and contacting the coating composition, the outermost coating comprising stabilized zirconia.

25. A barrier coating system according to claim 17, wherein the intermediate layer is one of multiple intermediate layers comprising an inner layer of silicon, an intermediate layer containing mullite and stoichiometric BSAS, and an outer layer of stoichiometric BSAS.

26. A barrier coating system according to claim 17, wherein the intermediate layer is one of multiple intermediate layers comprising an inner layer of silicon, an intermediate layer of mullite, and an outer layer of stoichiometric BSAS.

27. A barrier coating system according to claim 17, wherein the intermediate layer is one of multiple intermediate layers comprising an inner layer of silicon and an outer layer containing mullite and stoichiometric BSAS.

28. A barrier coating system according to claim 17, wherein the intermediate layer is one of multiple intermediate layers comprising an inner layer of silicon and an outer layer of mullite.

29. A barrier coating system on a surface of a gas turbine engine component, the barrier coating system comprising at least one intermediate layer and a coating composition on the intermediate layer, the coating composition consisting essentially of an alkaline earth aluminate containing alumina and at least one of barium oxide and strontia.

30. A barrier coating system according to claim 29, wherein the alkaline earth aluminate is barium strontium aluminate.

31. A barrier coating system according to claim 29, wherein the alkaline earth aluminate consists of barium oxide, strontia and alumina in a molar ratio of about 0.8:0.2:1, respectively, and incidental impurities.

32. A barrier coating system according to claim 29, wherein the intermediate layer is formed of a material chosen from the group consisting of silicon, mullite, stoichiometric BSAS, and mixtures of mullite and stoichiometric BSAS.

33. A barrier coating system according to claim 29, wherein the surface of the component is defined by a silicon-based composite material.

\* \* \* \* \*